US012707381B2

(12) United States Patent
Wang et al.

(10) Patent No.: US 12,707,381 B2
(45) Date of Patent: Aug. 11, 2026

(54) SECONDARY CELL ADDING METHOD, TERMINAL, AND CHIP

(71) Applicant: HONOR DEVICE CO., LTD., Shenzhen (CN)

(72) Inventors: Feng Wang, Shenzhen (CN); Bing Wang, Shenzhen (CN); Wenjiao Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 139 days.

(21) Appl. No.: 17/779,065

(22) PCT Filed: Mar. 2, 2021

(86) PCT No.: PCT/CN2021/078783
§ 371 (c)(1),
(2) Date: May 23, 2022

(87) PCT Pub. No.: WO2021/227607
PCT Pub. Date: Nov. 18, 2021

(65) Prior Publication Data

US 2023/0066322 A1 Mar. 2, 2023

(30) Foreign Application Priority Data

May 14, 2020 (CN) ......................... 202010405125.8
Aug. 6, 2020 (CN) ......................... 202010785257.8

(51) Int. Cl.
*H04W 48/20* (2009.01)
*H04W 24/08* (2009.01)
(Continued)

(52) U.S. Cl.
CPC ........... *H04W 48/20* (2013.01); *H04W 24/08* (2013.01); *H04W 24/10* (2013.01); *H04W 48/16* (2013.01)

(58) Field of Classification Search
CPC ..... H04W 76/16; H04W 48/20; H04W 48/16; H04W 24/08; H04W 24/10; H04W 60/04; H04W 88/06
See application file for complete search history.

(56) References Cited

U.S. PATENT DOCUMENTS 8,929,889 B1 * 1/2015 Prock .................... H04W 48/16 455/434
11,006,356 B2 5/2021 Koziol et al.
(Continued)

FOREIGN PATENT DOCUMENTS

AU 2005219314 A1 * 9/2005 .......... H04W 36/304
AU 2008205793 A1 * 7/2008 ............ H04W 48/20
(Continued)

OTHER PUBLICATIONS

Ericsson, “Camping in NR,” 3GPP TSG-RAN WG2 #100, Tdoc R2-1712528 (Resubmission of R2-1710475), Reno, Nevada, USA, Nov. 27-Dec. 1, 2017, 3 pages.
(Continued)

*Primary Examiner* — Mehmood B. Khan
(74) *Attorney, Agent, or Firm* — Fish & Richardson P.C.

(57) ABSTRACT

A secondary cell adding method, a terminal, and a chip are disclosed, which relate to the field of communication technologies. The method is performed by a terminal and includes: camping on a first primary cell supporting NSA; receiving, a secondary cell measurement message from a network device, where the secondary cell measurement message includes a frequency of a first secondary cell and a first signal energy threshold, and a frequency of a second secondary cell and a second signal energy threshold; performing secondary cell measurement based on the frequency of the first secondary cell, where a priority of the frequency of the first secondary cell is higher than a priority of the frequency of the second secondary cell; and performing an
(Continued)

operation of adding the first secondary cell if signal energy detected at the frequency of the first secondary cell is greater than the first signal energy threshold.

13 Claims, 6 Drawing Sheets

(51) Int. Cl.
*H04W 24/10* (2009.01)
*H04W 48/16* (2009.01)

(56) References Cited

U.S. PATENT DOCUMENTS

| | | | | |
|---|---|---|---|---|
| 11,025,401 | B2 | 6/2021 | Kadiri et al. | |
| 2005/0197124 | A1* | 9/2005 | Kang | H04W 36/304 455/439 |
| 2009/0005029 | A1* | 1/2009 | Wang | H04W 24/10 455/423 |
| 2009/0042601 | A1* | 2/2009 | Wang | H04W 36/0088 455/553.1 |
| 2010/0273485 | A1* | 10/2010 | Huang | H04W 36/34 455/435.3 |
| 2011/0110254 | A1* | 5/2011 | Ji | H04W 36/0066 370/252 |
| 2012/0052864 | A1* | 3/2012 | Swaminathan | H04W 36/0061 455/436 |
| 2013/0007039 | A1* | 1/2013 | Edara | H04W 48/16 709/219 |
| 2013/0115991 | A1* | 5/2013 | Awoniyi | H04W 24/10 455/517 |
| 2013/0343223 | A1* | 12/2013 | Martin | H04W 48/16 370/252 |
| 2015/0341892 | A1* | 11/2015 | Aldana | H04W 64/00 455/456.2 |
| 2018/0359790 | A1* | 12/2018 | Ingale | H04W 72/51 |
| 2019/0182675 | A1 | 6/2019 | Pu et al. | |
| 2020/0008116 | A1* | 1/2020 | Zhang | H04W 36/008357 |
| 2020/0068638 | A1* | 2/2020 | Au | H04W 48/16 |
| 2021/0368568 | A1* | 11/2021 | Jangid | H04W 48/20 |

FOREIGN PATENT DOCUMENTS

| | | | |
|---|---|---|---|
| CN | 108141749 | A | 6/2018 |
| CN | 108696881 | A | 10/2018 |
| CN | 108834199 | A | 11/2018 |
| CN | 109862595 | A | 6/2019 |
| CN | 110381550 | A | 10/2019 |
| CN | 110945912 | A | 3/2020 |
| WO | 2015109559 | A1 | 7/2015 |
| WO | 2016117985 | A1 | 7/2016 |
| WO | 2019193237 | A1 | 10/2019 |

OTHER PUBLICATIONS

Ericsson, “Handling RAT priorities in low frequency NR deployment scenarios,” 3GPP TSG-RAN2 Meeting #104, R2-1817124 (Resubmission of R2-1814509), Spokane, USA, Nov. 12-16, 2018, 4 pages.

* cited by examiner

SECONDARY CELL ADDING METHOD, TERMINAL, AND CHIP

CROSS-REFERENCE TO RELATED APPLICATIONS

This application is a national stage of International Application No. PCT/CN2021/078783 filed on Mar. 2, 2021, which claims priority to Chinese Patent Application No. 202010405125.8, filed on May 14, 2020, and Chinese Patent Application No. 202010785257.8, filed on Aug. 6, 2020. The aforementioned applications are incorporated herein by reference in their entireties.

TECHNICAL FIELD

This application relates to the field of communication technologies, and in particular, to a secondary cell adding method, a terminal, and a chip.

BACKGROUND

The 5th Generation (5G) standard provides two networking solutions: standalone (SA) and non-standalone (NSA). When NSA uses an E-UTRA-NR dual connectivity (EN-DC) network architecture formed by Long Term Evolution (LTE) and new radio (NR), both an LTE base station and an NR base station can serve a terminal. For the terminal, the LTE base station is a master base station or a master node (MN), and the terminal is served by an anchor cell; and the NR base station is a secondary base station or a secondary node (SN). The anchor cell is a serving cell provided by the LTE base station, and is a primary cell/primary serving cell (PCell); and the serving cell provided by the NR base station is a secondary cell/secondary serving cell (SCell).

Specifically, the SCell can be added only when the terminal camps on the anchor cell, so that both the LTE base station and the NR base station can serve the terminal. However, in the existing technology, only signal energy is considered for adding the SCell, which may result in relatively low total bandwidth of the anchor cell on which the terminal camps and the added SCell, thereby reducing user experience.

SUMMARY

Embodiments of this application provide a secondary cell adding method, a terminal, and a chip, so that a terminal can add a secondary cell based on a frequency priority of the secondary cell, and compared with considering only signal energy, the added secondary cell can better meet a communication requirement, and user experience is improved.

According to a first aspect, an embodiment of this application provides a secondary cell adding method, specifically including: A terminal camps on a first primary cell, where the first primary cell supports NSA networking; the terminal receives a secondary cell measurement message sent by a network device, where the secondary cell measurement message includes a frequency of a first secondary cell and a first signal energy threshold, and a frequency of a second secondary cell and a second signal energy threshold; then the terminal performs secondary cell measurement based on the frequency of the first secondary cell, where a priority of the frequency of the first secondary cell is higher than a priority of the frequency of the second secondary cell; and if signal energy detected at the frequency of the first secondary cell is greater than or equal to the first signal energy threshold, the terminal performs an operation of adding the first secondary cell.

In this embodiment of this application, if a priority of the frequency of the first secondary cell is higher than a priority of the frequency of the second secondary cell, the terminal may first perform secondary cell measurement based on the priority of the frequency of the first secondary cell, so that the terminal may preferentially add the first secondary cell, and the added secondary cell can better meet a communication requirement, thereby improving user experience.

It should be understood that the first secondary cell and the second secondary cell are secondary cells configured for the first primary cell.

In a possible design, if no signal energy is detected at the frequency of the first secondary cell or the signal energy detected at the frequency of the first secondary cell is less than the first signal energy threshold, the terminal performs the secondary cell measurement based on the frequency of the second secondary cell. The foregoing technical solution helps reduce a possibility that the terminal fails to add the secondary cell when signal energy is not detected at the frequency of the secondary cell with a higher priority or the detected signal energy is relatively weak.

In a possible design, if total bandwidth of the first secondary cell and the first primary cell is greater than total bandwidth of the second secondary cell and the first primary cell, the priority of the frequency of the first secondary cell is higher than the priority of the frequency of the second secondary cell. Therefore, the terminal may preferentially add a secondary cell with a relatively high bandwidth. Alternatively, if the bandwidth of the first secondary cell is greater than the bandwidth of the second secondary cell, the priority of the frequency of the first secondary cell is higher than the priority of the frequency of the second secondary cell.

Further, in a possible design, the frequency of the first secondary cell is a frequency of a secondary cell that has been historically added by the terminal, and the frequency of the first secondary cell and the bandwidth of the first secondary cell are stored in the terminal.

In a possible design, the terminal adds the first secondary cell in the following manner:

The terminal sends a secondary cell measurement report to the network device if the signal energy detected at the frequency of the first secondary cell is greater than or equal to the first signal energy threshold, where the secondary cell measurement report is used to indicate the first secondary cell; and then the terminal receives a secondary cell addition indication sent by the network device, where the secondary cell addition indication is used to indicate the first secondary cell; and after receiving the secondary cell addition indication sent by the network device, the terminal performs the operation of adding the first secondary cell based on the secondary cell addition indication. In this way, the network device controls addition of the secondary cell 1 of the terminal.

In a possible design, the terminal starts a timer in response to sending the secondary cell measurement report to the network device, where timing duration of the timer is first duration; and if the terminal does not receive the secondary cell addition indication from the network device after the timer expires, the terminal performs the secondary cell measurement based on the frequency of the second secondary cell. Therefore, efficiency of adding the secondary cell by the terminal is improved, and a possibility of failing to add the secondary cell is reduced.

In a possible design, the terminal searches for a primary cell in descending order of priorities of primary cells, Therefore, the terminal preferentially camps on a primary cell with a relatively high priority.

In a possible design, the terminal searches for a primary cell in descending order of priorities of primary cells in the following manner:

The terminal searches for a primary cell in descending order of bandwidth of cell combinations, where each cell combination includes a primary cell and a secondary cell. Therefore, the terminal preferentially camps on a primary cell with a relatively high cell combination bandwidth.

In a possible design, the first primary cell is a first LTE cell, the first secondary cell is a first NR cell, and the second secondary cell is a second NR cell.

According to a second aspect, an embodiment of this application provides another secondary cell adding method, specifically including:

A terminal detects a first event, where the first event is used to trigger a Long Term Evolution LTE cell search; and the terminal obtains frequency information and a cell identity of a first LTE cell based on cell combination related information, and performs an LTE cell search based on the frequency information and the cell identity of the first LTE cell, where the cell combination related information is used to indicate K cell combinations and bandwidth of the K cell combinations and is pre-stored in the terminal, each cell combination in the K cell combinations includes one LTE cell and one new radio NR cell, the first LTE cell is an LTE cell in a first cell combination and supports non-standalone networking, and the first cell combination is a cell combination with the highest bandwidth in the K cell combinations;

when the terminal camps on the first LTE cell, the terminal sends an LTE search result to an LTE base station, where the LTE search result includes frequency information of the first LTE cell and a cell identity of the first LTE cell;

the terminal receives an NR cell measurement message from the LTE base station, where the NR cell measurement message includes a frequency of a first NR cell and a first signal energy threshold, and a frequency of a second NR cell and a second signal energy threshold;

the terminal determines, based on the cell combination bandwidth information, whether bandwidth of a cell combination formed by the first LTE cell and the first NR cell is greater than bandwidth of a cell combination formed by the first LTE cell and the second NR cell;

if the bandwidth of the cell combination formed by the first LTE cell and the first NR cell is greater than the bandwidth of the cell combination formed by the first LTE cell and the second NR cell, the terminal performs NR cell measurement based on the frequency of the first NR cell; or if signal energy detected at the frequency of the first NR cell is greater than or equal to the first signal energy threshold, the terminal sends an NR cell measurement report to the LTE base station, where the NR cell measurement report is used to indicate the first NR cell;

the terminal starts a timer in response to sending the NR cell measurement report to the LTE base station, where timing duration of the timer is first duration; and if the terminal receives an NR cell addition indication from the LTE base station before the timer expires, where the NR cell addition indication is used to indicate the first NR cell, the terminal performs an operation of adding an NR cell based on the NR cell addition indication; or if the terminal does not receive the NR cell addition indication from the LTE base station until the timer expires, the terminal performs the NR cell measurement based on the frequency of the second NR cell.

In this embodiment of this application, because the terminal may perform an LTE cell search and add an NR cell based on the bandwidth of the LTE cell and the bandwidth of the NR cell, the camped-on LTE cell and the added NR cell can better meet a communication requirement, thereby improving user experience.

According to a third aspect, an embodiment of this application provides a terminal, including a processing module and a transceiver module, where the processing module is configured to camp on a first primary cell, and the first primary cell supports NSA;

the transceiver module is configured to receive a secondary cell measurement message sent by a network device, where the secondary cell measurement message includes a frequency of a first secondary cell and a first signal energy threshold, and a frequency of a second secondary cell and a second signal energy threshold; and the processing module is further configured to: perform secondary cell measurement based on the frequency of the first secondary cell, where a priority of the frequency of the first secondary cell is higher than a priority of the frequency of the second secondary cell; and if signal energy detected at the frequency of the first secondary cell is greater than or equal to the first signal energy threshold, perform an operation of adding the first secondary cell.

In a possible design, the processing module is further configured to: if no signal energy is detected at the frequency of the first secondary cell or the signal energy detected at the frequency of the first secondary cell is less than the first signal energy threshold, perform the secondary cell measurement based on the frequency of the second secondary cell.

In a possible design, total bandwidth of the first secondary cell and the first primary cell is greater than total bandwidth of the second secondary cell and the first primary cell, and bandwidth of the first secondary cell is greater than bandwidth of the second secondary cell.

In a possible design, the frequency of the first secondary cell is a frequency of a secondary cell that has been historically added by the terminal, and the frequency of the first secondary cell and bandwidth of the first secondary cell are stored in the terminal.

In a possible design, if the signal energy detected at the frequency of the first secondary cell is greater than or equal to the first signal energy threshold, the processing module performs the operation of adding the first secondary cell in the following manner:

The processing module is configured to: if the signal energy detected at the frequency of the first secondary cell is greater than or equal to the first signal energy threshold, trigger the transceiver module to send a secondary cell measurement report to the network device, where the secondary cell measurement report is used to indicate the first secondary cell, and after the transceiver module receives a secondary cell addition indication sent by the network device, perform the operation of adding the first secondary cell based on the secondary cell addition indication, where the secondary cell addition indication is used to indicate the first secondary cell.

In a possible design, the processing module is further configured to: start a timer in response to sending the secondary cell measurement report to the network device, where timing duration of the timer is first duration; and if the transceiver module does not receive the secondary cell addition indication from the network device after the timer expires, perform the secondary cell measurement based on the frequency of the second secondary cell.

In a possible design, the processing module is further configured to search for a primary cell in descending order of priorities of primary cells.

In a possible design, the processing module searches for a primary cell in descending order of priorities of primary cells in the following manner:

searching for a primary cell in descending order of bandwidth of cell combinations, where each cell combination includes a primary cell and a secondary cell.

In a possible design, the first primary cell is a first LTE cell, the first secondary cell is a first NR cell, and the second secondary cell is a second NR cell.

According to a fourth aspect, an embodiment of this application provides a chip, including: a processor and a communication interface, where the processor is configured to camp on a first primary cell, and the first primary cell supports NSA;

the communication interface is configured to receive a secondary cell measurement message sent by a network device, where the secondary cell measurement message includes a frequency of a first secondary cell and a first signal energy threshold, and a frequency of a second secondary cell and a second signal energy threshold; and the processor is further configured to: perform secondary cell measurement based on the frequency of the first secondary cell, where a priority of the frequency of the first secondary cell is higher than a priority of the frequency of the second secondary cell; and if signal energy detected at the frequency of the first secondary cell is greater than or equal to the first signal energy threshold, perform an operation of adding the first secondary cell.

In a possible design, the processor is further configured to: if no signal energy is detected at the frequency of the first secondary cell or signal energy detected at the frequency of the first secondary cell is less than the first signal energy threshold, perform the secondary cell measurement based on the frequency of the second secondary cell.

In a possible design, total bandwidth of the first secondary cell and the first primary cell is greater than total bandwidth of the second secondary cell and the first primary cell; and bandwidth of the first secondary cell is greater than bandwidth of the second secondary cell.

In a possible design, a frequency of the first secondary cell is a frequency of a historically added secondary cell, and a frequency of the first secondary cell and bandwidth of the first secondary cell are stored on the chip or a terminal in which the chip is located.

In a possible design, the processor is configured to: if the signal energy detected at the frequency of the first secondary cell is greater than or equal to the first signal energy threshold, perform the operation of adding the first secondary cell in the following manner:

The processor is configured to: if the signal energy detected at the frequency of the first secondary cell is greater than or equal to the first signal energy threshold, trigger the communication interface to send a secondary cell measurement report to the network device, where the secondary cell measurement report is used to indicate the first secondary cell; and after the communication interface receives the secondary cell addition indication sent by the network device, perform the operation of adding the first secondary cell based on the secondary cell addition indication, where the secondary cell addition indication is used to indicate the first secondary cell.

In a possible design, the processor is further configured to: start a timer in response to sending the secondary cell measurement report to the network device, where timing duration of the timer is first duration; and if the communication interface does not receive the secondary cell addition indication from the network device until the timer expires, perform the secondary cell measurement based on the frequency of the second secondary cell.

In a possible design, the processor is further configured to search for a primary cell in descending order of priorities of primary cells.

In a possible design, the processor searches a primary cell in descending order of priorities of primary cells in the following manner:

searching for a primary cell in descending order of bandwidth of cell combinations, where each cell combination includes a primary cell and a secondary cell.

In a possible design, the first primary cell is a first LTE cell, the first secondary cell is a first NR cell, and the second secondary cell is a second NR cell.

According to a fifth aspect, an embodiment of this application provides an apparatus, where the apparatus includes a processor, configured to implement the method according to any one of the first aspect and the possible designs of the first aspect. The apparatus may further include a memory, configured to store a computer program. The memory is coupled to the processor, and when executing the computer program stored in the memory, the processor may implement the method according to any one of the first aspect and the possible designs of the first aspect. The apparatus may further include a communication interface, and the communication interface is used by the apparatus to communicate with another device. For example, the communication interface may be a transceiver, a circuit, a bus, a module, or another type of communication interface, and the another device may be a network device, a terminal, or the like.

According to a sixth aspect, an embodiment of this application provides a computer readable storage medium storing a computer program, and when the computer program is executed on a computer, the computer is enabled to perform the method according to any one of the first aspect and the possible designs of the first aspect.

According to a seventh aspect, an embodiment of this application provides a computer program product, including a computer program, where when the computer program runs on a computer, the computer is enabled to perform the method according to any one of the first aspect and the possible designs of the first aspect.

In addition, for technical effects brought by any one of the third aspect to the seventh aspect, refer to technical effects brought by different design manners in the method part. Details are not described herein again.

DESCRIPTION OF EMBODIMENTS

NSA is a networking solution proposed in the 5G standard. Currently, NSA uses a dual connectivity (DC) network architecture, so that two base stations can simultaneously serve a terminal. For the terminal, one base station is a master base station or an MN, and the other base station is a secondary base station or an SN. Specifically, a serving cell provided by the master base station is a PCell, and a serving cell provided by the secondary base station is a SCell. It should be understood that, in NSA, a SCell can be added only when the PCell on which the terminal camps is an anchor cell, so that two base stations can simultaneously serve a terminal. The anchor cell may be understood as a serving cell that supports NSA.

That a DC network architecture used by NSA is an EN-DC network architecture is used as an example. In this case, the LTE base station (which may also be referred to as a 4G base station) and the NR base station (which may also be referred to as a 5G base station) may simultaneously serve a terminal. For the terminal, the LTE base station is a master eNodeB or an MN, and the NR base station is a secondary eNodeB or an SN. It may be understood that a serving cell provided by the LTE base station may be referred to as an LTE cell and is a PCell; and a serving cell provided by the NR base station may be referred to as an NR cell for short and is a SCell. If the camped-on DE cell is an anchor cell, the terminal may add an NR cell (that is, a SCell), to enable both the LTE base station and the NR base station to serve a terminal.

Figure 1:
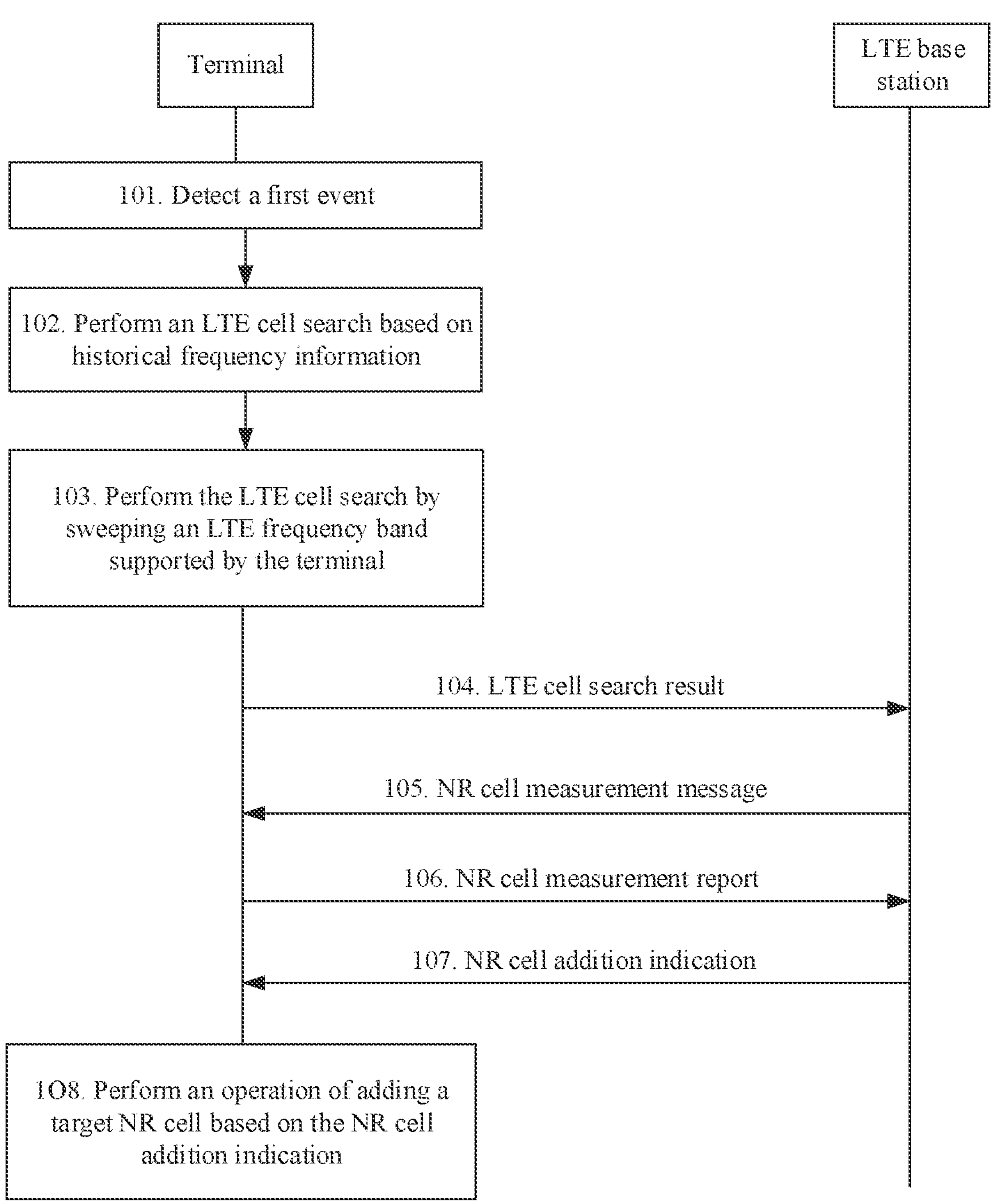
FIG. 1 is a schematic flowchart of a cell search method according to an embodiment of this application.

Generally, the terminal performs an LTE cell search based on a cell search method shown in FIG. 1, so as to camp on the LTE cell. Specifically, the method includes the following steps:

101. A terminal detects a first event. The first event is used to trigger an LTE cell search. For example, the first event is an operation of disabling a flight mode. For another example, the first event is a power-on operation. For another example, the first event is that a mobile network signal strength of the terminal is less than a threshold, and the mobile network signal strength of the terminal is used to indicate received signal quality of the terminal or a received signal strength of the terminal. The foregoing description is merely an example of the first event, and does not constitute a limitation on an event used to trigger an LTE cell search. In this embodiment of this application, another event may be used to trigger the terminal to perform the LTE cell search.

102. The terminal performs the LTE cell search based on historical frequency information. The historical frequency information is used to indicate a frequency of an LTE cell on which the terminal has camped. For example, the historical frequency information may be a frequency value (for example, 2350 MHz) or a number of a frequency value (for example, number "1", where the number "1" is used to identify 2350 MHz), and numbers of different frequency values are different.

It may be understood that if a plurality of pieces of historical frequency information are stored in the terminal, the terminal performs the LTE cell search based on a storage sequence of the historical frequency information, and stops the LTE cell search when an LTE cell is found. After all the stored historical frequency information is traversed by the terminal, and no DE cell is found, step 103 is performed.

For example, historical frequency information 1, historical frequency information 2, and historical frequency information 3 are stored in the terminal. The historical frequency information 1 is used to indicate a frequency 1 of the LTE cell on which the terminal has camped, the historical frequency information 2 is used to indicate a frequency 2 of the LTE cell on which the terminal has camped, and the historical frequency information 3 is used to indicate a frequency 3 of the LTE cell on which the terminal has camped. In addition, the terminal has successively camped on the frequency 1, the frequency 2, and the frequency 3 in a time sequence. When the terminal camped on the frequency 1, the historical frequency information 1 is stored. Similarly, when the terminal camped on the frequency 2, the historical frequency information 2 is stored. When the terminal camped on the frequency 3, the historical frequency information 3 is stored. That is, the historical frequency information 1 is first stored in the terminal, then the historical frequency information 2 is stored in the terminal, and finally the historical frequency information 3 is stored in the terminal. In this case, in response to detecting the first event, the terminal may first perform an LTE cell search based on the historical frequency information 3. If the terminal does not find an LTE cell based on the historical frequency information 3, the terminal attempts to perform the LTE cell search based on the historical frequency information 2. If the terminal still does not find an LTE cell based on the historical frequency information 2, the terminal attempts to perform the LTE cell search based on the historical frequency information 1. If the terminal still does not find an LTE cell based on the historical frequency information 1, step 103 is performed.

Certainly, it may be understood that if the terminal finds an LTE cell based on the historical frequency information 1, the terminal stops the LTE cell search, that is, no longer performs the LTE cell search based on the historical frequency information 2 or the historical frequency information 3. If the terminal does not find an LTE cell based on the historical frequency information 1, the terminal continues to perform the LTE cell search based on the historical frequency information 2. If the terminal finds an LTE cell based on the historical frequency information 2, the terminal stops the LTE cell search, that is, no longer performs the LTE cell search based on the historical frequency information 3.

Using the historical frequency information 1 as an example, the terminal performs the LTE cell search based on the historical frequency information 1 in the following manner: The terminal performs signal energy detection at a frequency 1 (that is, a frequency indicated by the historical frequency information 1). If the terminal detects signal energy at the frequency 1, the terminal receives system information of a target LTE cell, where a frequency of the target LTE cell is the frequency 1, and the system information includes a signal energy threshold. The terminal determines whether the signal energy detected at the frequency 1 is less than the signal energy threshold included in the system information, if the signal energy detected by the terminal at the frequency 1 is greater than or equal to the signal energy threshold included in the system information of the target LTE cell, the target LTE cell is an LTE cell found by the terminal. However, if the terminal detects no signal energy at the frequency 1, or the detected signal energy is less than the signal energy threshold in the system information of the target LTE cell, the terminal does not find an LTE cell based on the historical frequency information 1.

Alternatively, if the terminal stores a plurality of pieces of historical frequency information, the terminal may separately perform signal energy detection based on the plurality of pieces of historical frequency information. Then, the terminal receives the system information of the target LTE cell at a frequency with highest signal energy among the frequencies indicated by the plurality of pieces of historical frequency information. The frequency of the target LTE cell is a frequency with highest signal enemy among the frequencies indicated by the plurality of historical frequency information.

103. If the terminal does not find an LTE cell based on the historical frequency information, the terminal sweeps an LTE frequency band supported by the terminal to perform the LTE cell search, and stops the LTE cell search when the LTE cell is found. The LTE frequency hand may also be referred to as a 4G frequency hand, and is a frequency hand used for deploying a 4G network (that is, an LTE network or a network in which an LTE base station is located)).

It should be noted that, that the terminal sweeps an LTE frequency hand supported by the terminal to perform the LTE cell search may be understood as follows: The terminal may sequentially perform, in ascending order of frequencies on the LTE frequency band supported by the terminal, the LTE cell search on the LTE frequency band supported by the terminal. An interval between frequencies used by the terminal for two consecutive LTE cell searches is a sweep interval. The sweep interval may be predefined, may be indicated to the terminal by the LTE base station, or may be determined by the terminal based on an algorithm or a policy. This is not limited herein.

For example, the LTE frequency band supported by the terminal is 2320 MHz-2370 MHz, and the sweep interval is 10 MHz, the terminal may first perform the LTE cell search at 2320 MHz. If the terminal does not find an LTE cell at 2320 MHz, the terminal attempts to perform the LTE cell search at 2330 MHz. If the terminal finds an LTE cell at 2330 MHz, the terminal stops the LTE cell search. Certainly, in a process in which the terminal performs the LTE cell search by sweeping the frequency band supported by the terminal, the terminal may change the sweep interval, or may not change the sweep interval, which is related to specific implementation of the terminal. This is not limited herein.

104. If the terminal finds an LTE cell 1 by sweeping the LTE frequency band supported by the terminal, the terminal registers with the LTE cell 1, and reports an LTE cell search result to the LTE base station. The LTE cell search result is used to indicate the LTE cell 1. For example, the LTE cell search result includes a cell identity of the LTE cell 1 and frequency information of the LTE cell 1. The frequency information of the LTE cell 1 may be a frequency value, or may be a frequency number. This is not limited.

105. After receiving the LTE cell search result from the terminal, the LTE base station sends an NR cell measurement message to the terminal, where the NR cell measurement message includes frequency-related information of M NR cells. M is a positive integer greater than or equal to 1, and frequency-related information of each NR cell includes frequency information of one NR cell configured for the LTE cell 1 and a signal energy threshold of a frequency of the NR cell. It may be understood that the frequency information of the NR cell may be a frequency value, or may be a frequency number. This is not limited. In addition, it should be noted that signal energy thresholds of frequencies of different NR cells may be the same or different. For example, the signal energy threshold of a frequency 1 is a threshold 1, and the signal energy threshold of a frequency 2 is a threshold 2. The frequency 1 is a frequency of one NR cell, and the frequency 2 is a frequency of another NR cell, Values of the threshold 1 and the threshold 2 may be the same or different.

106. After receiving the NR cell measurement message from the LTE base station, the terminal performs the NR cell measurement based on the frequency-related information of the M NR cells, and sends an NR cell measurement report to the LTE base station. The NR cell measurement report includes the frequency information of an NR cell.

Specifically, the terminal performs the NR cell measurement based on the frequency-related information of the M NR cells in the following manner:

First, the terminal randomly selects one piece of frequency information of the NR cell from the frequency information of the M NR cells configured for the LTE cell 1, That the terminal randomly selects the frequency information of the NR cell from the frequency information of the M NR cells configured for the LTE cell to indicate a frequency A is used as an example. Then, the terminal performs signal energy detection at the frequency A. If signal energy detected by the terminal at the frequency A is greater than or equal to the signal energy threshold of the frequency A, the terminal no longer uses frequency-related information of another NR cell to perform signal energy detection, and sends an NR cell measurement report to the LTE base station, and the frequency information of the NR cell included in the NR cell measurement report is used to indicate the frequency A. It should be understood that if the terminal detects no signal energy at the frequency A, or the detected signal energy is less than the signal energy threshold of the frequency A, the terminal randomly selects frequency information of one NR cell from the frequency information of the M-1 NR cells except the frequency information indicating the frequency A in the frequency information of the M NR cells, to perform signal energy detection until the detected signal energy is greater than the signal energy threshold of the corresponding frequency.

In some embodiments, if the signal energy detected based on the frequency-related information of each of the M NR cells of the terminal is less than the signal energy threshold of the corresponding frequency, the terminal does not need to send the NR cell measurement report to the LTE base station, and may re-sweep a frequency band except the frequency of the LTE cell 1 on an LTE frequency band supported by the terminal, and perform the LTE cell search.

107. After receiving the NR cell measurement report from the terminal, the LTE base station sends an NR cell addition indication to the terminal based on the NR cell measurement report. The NR cell addition indication is used to indicate a target NR cell, and the frequency information of the target NR cell is the frequency information of the NR cell included in the NR cell measurement report. Specifically, the NR cell addition indication may include a cell identity and the frequency information of the target NR cell.

108. The terminal receives the NR cell addition indication from the LTE base station, and performs an operation of adding the target NR cell based on the NR cell addition indication, so that the terminal can add an NR cell when camping on the LTE cell 1, so that both the LTE base station and the NR base station can serve the terminal.

Further, if the terminal finds an LTE cell based on the historical frequency information, the terminal does not need to perform the LTE cell search by sweeping the LTE frequency band supported by the terminal, and can perform LTE cell registration, report the LTE cell search result to the LTE base station, and perform subsequent steps. For details, refer to step 105 to step 108.

In addition, if the terminal does not store the historical frequency information, the terminal may perform, in response to detecting a first event, the LTE cell search by sweeping the frequency band supported by the terminal.

However, only LTE cells at some frequencies on the LTE frequency band are deployed as anchor cells; and in the method shown in FIG. 1, when a terminal selects frequency information used to perform LTE cell search, only a storage order of historical frequency information or a value of the frequency on an LTE frequency band supported by the terminal is considered. Therefore, an LTE cell found by the terminal may be a non-anchor cell. If an LTE cell found by the terminal is a non-anchor cell, the terminal cannot add an NR cell and cannot access a 5G network.

Bandwidth of different LTE cells or NR cells is generally different. For example, for an NR cell whose frequency band is on a sub6G band, bandwidth of the NR cell may be 5M, 10M, 15M, 20M, 25M, 30M, 40M, 50M, 60M, 80M, 100M, or the like. For another example, for an NR cell whose frequency hand is on a millimeter wave band, bandwidth of the NR cell may be 50M, 100M, 200M, 400M, or the like. By using the method shown in FIG. 1, the terminal can add an NR cell even if the found LIM cell is an anchor cell. Because only signal energy is considered in the LTE cell search and addition of the NR cell, the LTE cell and the NR cell that are searched by the terminal may not have the highest total bandwidth by summing the bandwidth of the LTE cell and the bandwidth of the NR cell.

For example, the terminal finds an LTE cell 1, and three NR cells are configured for an LTE cell 1: an NR cell 1, an NR cell 2, and an NR cell 3. The NR cell 3 has the highest bandwidth, and the NR cell 1 has minimum bandwidth. The NR cell measurement message sent by the LTE base station to the terminal includes frequency-related information of the NR cell 2 and frequency-related information of the NR cell 3. In the method shown in FIG. 1, the terminal randomly selects the frequency information of the NR cell from the frequency information of the NR cell 2 and the frequency information of the NR cell 3 to perform signal energy detection. If the terminal selects the frequency information of the NR cell 2 to perform signal energy detection, and the signal energy detected at the frequency of the NR cell 2 is greater than or equal to the signal energy threshold of the frequency of the NR cell 2, the terminal no longer performs signal energy detection based on the frequency information of the NR cell 1, and sends the NR cell measurement report to the LTE base station, so that the terminal is highly likely to perform an operation of adding the NR cell 2, thereby increasing the total bandwidth of a combination of the NR cell added by the terminal and the found LTE cell.

In view of this, an embodiment of this application provides a cell search method, so that a terminal can perform a cell search based on bandwidth of a PCell and bandwidth of a Scell, which not only helps improve a probability that the terminal finds an anchor cell, but also helps maximize the probability that a PCell and an added SCell that are found by the terminal have the highest total bandwidth, thereby improving user experience.

It should be understood that, in this embodiment of this application, "at least one" refers to one or more, and "a plurality of" refers to two or more. "And/or" describes an association relationship between associated objects, and represents that three relationships may exist. For example, "A and/or B" may represent the following cases: only A exists, both A and B exist, and only B exists, where A and B may be singular or plural. The character "/" generally, indicates that the associated objects are in a or relationship. "At least one of the following (items)" or a similar expression thereof means any combination of these items, including any combination of a single item or a plurality of items. For example. "at least one of a, b, or c" may represent "a, b, c, a and b", "a and c", "b and c" or "a, b and c", where a b, and c may be singular or plural.

It should be understood that the terms in this application is merely used to describe a specific embodiment and is not intended to limit this application. The singular turns "a", "the" and "this" used in this application and the appended claims are also intended to include most forms unless the context clearly represents other meanings.

In addition, although the terms "first", "second", and "third" may, be used in this application to describe various types of information, the information should not be limited to these terms. These terms are only used to distinguish information of a same type from each other. For example, without departing from the scope of this application, the first information may also be referred to as second information. Similarly, the second information may also be referred to as first information. Depending on the context, the term if used herein can be interpreted as "when" or "in response to determining that".

Figure 2:
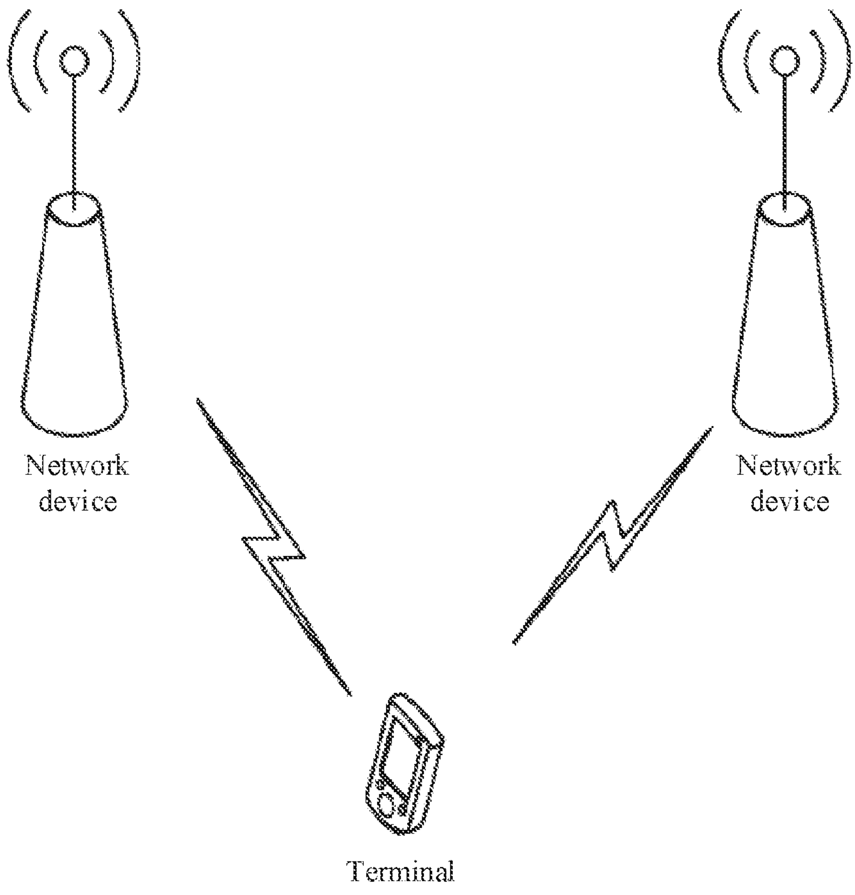
FIG. 2 is a schematic diagram of a network architecture according to an embodiment of this application.

FIG. 2 is a diagram illustrating a network architecture applicable to an embodiment of this application. The network architecture shown in FIG. 2 is a DC network architecture, that is, a connection relationship between a terminal and two network devices is a DC relationship. The two network devices may simultaneously serve the terminal. One of the network devices is a control plane anchor, a serving cell provided by the network device for the terminal is a PCell, and a serving cell provided by, the other network device for the terminal is a SCell.

In this embodiment of this application, a network device may also be referred to as an access network device, and is an entity on a network side that is used to transmit or receive a signal. For example, the network device may be an LTE base station, such as an evolved NodeB (evolutional Node B, eNB or e-NodeB), or may be an NR base station, such as a new radio controller (NR controller) or a gNB. Alternatively, the network device may be a centralized unit, a radio remote module, a micro base station, a relay, a distributed unit, a transmission reception point (TRP), a transmission point (TP), or any other radio access device. This is not limited in this embodiment of this application.

In this embodiment of this application, the terminal may also be referred to as a terminal device, user equipment (UE), a wireless terminal, a subscriber unit, a subscriber station, a mobile station, a mobile console (mobile), a remote station, an access point, a remote terminal, an access terminal, a user terminal, a user agent, or a user device. The terminal is an entity on the user side that is configured to receive or transmit a signal, and may provide a user with a voice call and/or a data service. For example, the terminal may be a portable device with a wireless connection function, an in-vehicle device, a mobile phone (or referred to as a "cellular" phone), a computer with a mobile terminal, or the like, for example, a portable, pocket-sized, handheld, computer built-in, or in-vehicle mobile apparatus. For another example, the terminal may further be a device such as a personal communication service (PCS) phone, a cordless phone, a session initiation protocol (SIP) phone, a wireless local loop (WLL) station, or a personal digital assistant (PDA). The example terminal may be a mobile phone, a tablet computer, a notebook computer, a palmtop computer, a mobile internet device (MID), a wearable device (such as a smartwatch, a smart band, or a pedometer). This is not limited.

Figure 3:
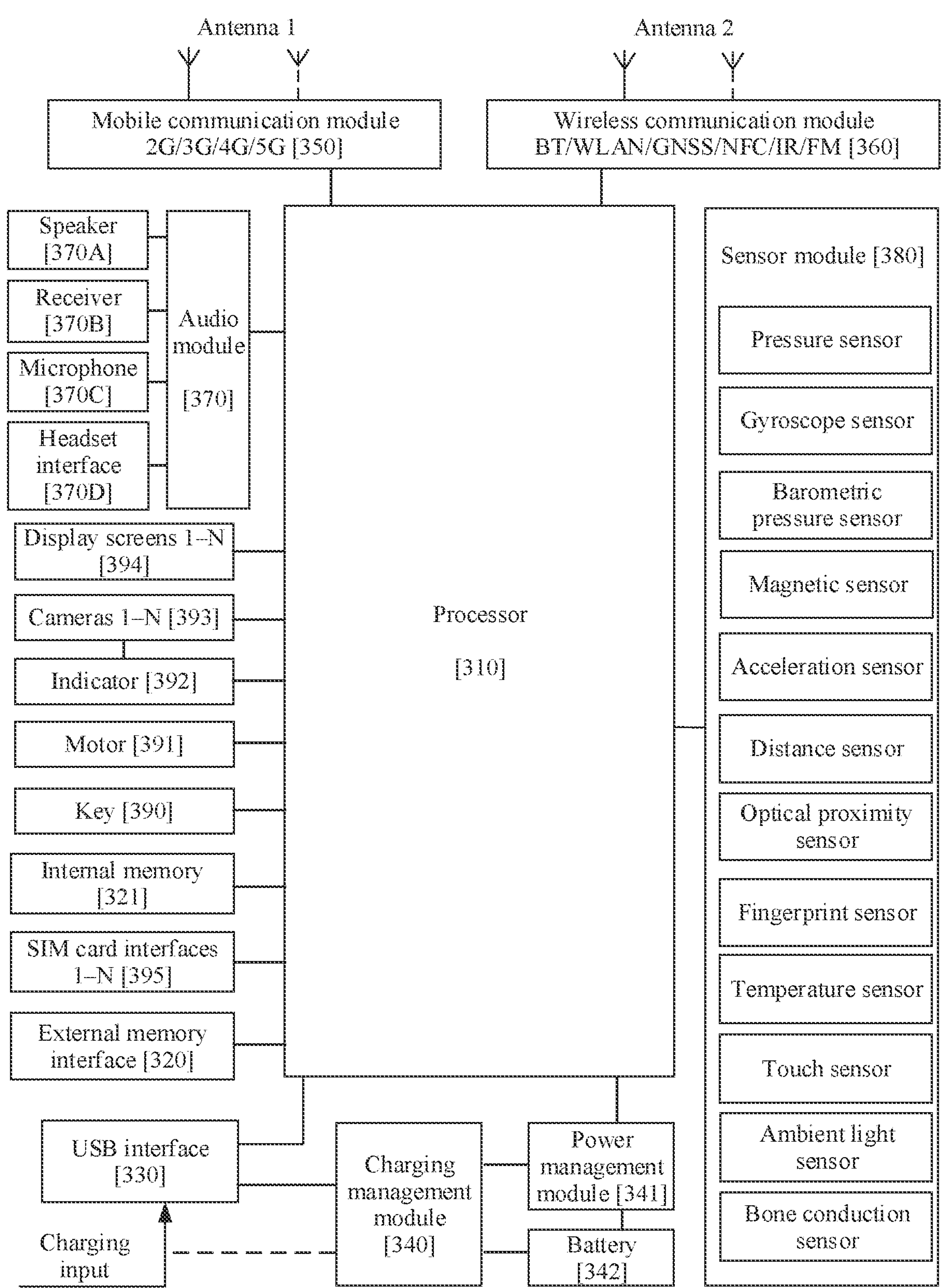
FIG. 3 is a schematic diagram of an architecture of a terminal according to an embodiment of this application.

For example, FIG. 3 is a schematic diagram of a structure of a terminal according to an embodiment of this application. As shown in the figure, the terminal may include a processor 310, an external memory interface 320, an internal memory 321, a universal serial bus (USB) interface 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset interface 370D, a sensor module 380, a key 390, a motor 391, an indicator 392, a camera 193, a display screen 394, and a subscriber identification module (SIM) interface 395, and the like. The sensor module 380 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

For example, the processor 310 may include one or more processing units. For example, the processor 310 includes an application processor (AP), a central processor (CP), and the like. The CP may include a modem processor and the like. The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. The demodulator then transmits the demodulated low-frequency baseband signal to a baseband processor for processing. After being processed by the baseband processor, the low-frequency baseband signal is transmitted to the application processor. In some embodiments, the modem processor may be an independent device. For example, the modem processor may be independent of the processor 310, and is disposed in a same component as the mobile communication module 350 or another function module.

The external memory interface 320 may be configured to connect to an external storage card, for example, a Micro SD card, to extend a storage capability of the terminal. The external storage card communicates with the processor 310 by using the external storage interface 320, to implement a data storage function.

The internal memory 321 may be configured to store computer executable program code, where the executable program code includes an instruction. The processor 310 executes various function applications of the terminal and data processing by running the instruction stored in the internal memory 321. The internal memory 321 may include a high-speed random access memory, and may further include a non-volatile memory, such as at least one magnetic disk storage device, a flash memory device, or a universal flash storage (universal flash storage, UFS.

The charging management module 340 is configured to receive a charging input from a charger. The charger may be a wireless charger, or may be a wired charger. In some wired charging embodiments, the charging management module 340 may receive a charging input of the wired charger by using the USB interface 330. In some wireless charging embodiments, the charging management module 340 may receive a wireless charging input by using a wireless charging coil of the terminal. When charging the battery 342, the charging management module 340 may further supply power to the terminal by using the power management module 341.

The power management module 341 is configured to connect the battery 342, the charging management module 340, and the processor 310. The power management module 341 receives an input of the battery 342 and/or an input of the charging management module 340, and supplies power to the processor 310, the internal memory 321, the external memory, the display screen 394, the camera 393, the wireless communication module 360, and the like. The power management module 341 may be further configured to monitor parameters such as a battery capacity, a battery cycle quantity, and a battery health state (leakage and impedance).

A wireless communication function of the terminal may be implemented by using an antenna 1, an antenna 2, a mobile communication module 350, a wireless communication module 360, a modem processor, a baseband processor, and the like.

The antenna 1 and the antenna 2 are configured to transmit and receive electromagnetic wave signals. Each antenna in the terminal may be configured to cover a single or a plurality of communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 350 may provide a solution for wireless communication (such as 2G/3G/4G/5G) that is applied to the terminal. The mobile communication module 350 may include at least one filter, a switch, a power amplifier, a low noise amplifier (LNA), and the like.

The wireless communication module 360 may provide a solution for wireless communication, such as a wireless local area network (WLAN) (such as a Wi-Fi network), a Bluetooth (BT), a global navigation satellite system (GNSS), a frequency modulation (FM), a near field communication (NFC), and an infrared (IR), that is applied to the terminal. The terminal implements a display function by using a graphics processor, the display screen 394, an AP, and the like. The display screen 394 is configured to display an image, a video, and the like. The terminal may implement a photographing function by using an image signal processor (ISP), the camera 193, a video codec, a graphics processor, the display screen 194, an AP, and the like.

The terminal may implement an audio function (for example, music playing and recording) by using an audio module 370, a speaker 370A, a receiver 370B, a microphone 370C, a headset interface 370D, and an AP.

The key 390 includes a power-on key, a volume key, and the like. The key 390 may be a mechanical key, or may be a touch button. The terminal may receive a key input to generate a key signal input related to a user setting and function control of the terminal.

The motor 391 may generate a vibration prompt. The motor 391 may be used for an incoming call vibration prompt, or may be used for touch vibration feedback. For example, a touch operation performed on different applications (for example, photographing and audio playback) may be corresponding to different vibration feedback effects.

The indicator 392 may be an indicator, and may be configured to indicate a charging state, a power change, or may be configured to indicate a message, a missed call, a notification, or the like.

The SIM card interface 395 is configured to connect to an SIM card. The SIM card may be inserted into the SIM card interface 395 or removed from the SIM card interface 395 to connect to or separate from the terminal. The terminal may support one or N SIM card interfaces, where N is a positive integer greater than 1. The SIM card interface 395 may support a Nano SIM card, a Micro SIM card, a SIM card, and the like. In some embodiments, the terminal uses an eSIM, that is, an embedded SIM card. The eSIM card can be embedded in the terminal and cannot be separated from the terminal.

It may be understood that the structure shown in this embodiment of this application does not constitute a specific limitation on the terminal. In some other embodiments of this application, the terminal may include more or fewer components than those shown in the figure, or combine some components, or split some components, or have different component arrangements. The components shown in the figure may be implemented by hardware, software, or a combination of software and hardware. It should be noted that the network architecture shown in FIG. 2 may be an EN-DC network architecture, an NR and LTE dual connectivity (NR-E-UTRA dual connectivity. NE-DC) network architecture, an LTE and NR dual connectivity (NG-RAN E-UTRA-NR dual connectivity, NGEN-DC) network architecture in a 5G core network (5G core, 5GC), or an NR and NR dual connectivity (NR dual connectivity, NR-DC) network architecture. This is not limited herein.

It should be understood that FIG. 2 is merely an example description, and does not constitute a limitation on the network architecture in this embodiment of this application. For example, FIG. 2 shows only one terminal and two network devices. However, the network architecture applied in this embodiment of this application may include a plurality of terminals, and may include three or more network devices.

The network architecture and the service scenario described in the embodiments of this application are intended to describe the technical solutions in the embodiments of this application more clearly, and do not constitute a limitation on the technical solutions provided in the embodiments of this application. It may be learned by a person of ordinary skill in the art that, with evolution of a network architecture and emergence of a new service scenario, the technical solutions provided in the embodiments of this application are also applicable to similar technical problems.

First, some nouns in this embodiment of this application are explained to facilitate understanding by a person skilled in the art.

1. Anchor cell. The anchor cell in this embodiment of this application may be understood as a serving cell that supports NSA and that is provided by a control plane anchor in NSA that uses a DC network architecture. Specifically, one or more SCells may be configured for the anchor cell. For example, in NSA that uses an EN-DC network architecture, the control plane anchor is an LTE base station, an anchor cell is an LTE cell that supports NSA, and one or more NR cells (that is, SCells) may be configured for the LTE cell that supports NSA.

2. Non-anchor cell. The non-anchor cell in this embodiment of this application may be understood as a serving cell that does not support NSA. No SCell is configured for the non-anchor cell. Non-anchor cells are all serving cells except the anchor cells provided by the control plane anchor. If the terminal registers with a non-anchor cell, no SCell can be added.

3. Cell combination related information. The cell combination related information in this embodiment of this application is used to indicate a cell combination and bandwidth of the cell combination. The cell combination may also be referred to as a DC combination. A cell combination includes one PCell and one SCell. The PCell herein is an anchor cell. The bandwidth of a cell combination refers to total bandwidth of the PCell and the SCell, that is, the sum of the bandwidth of the PCell and the bandwidth of the SCell. Specifically, the cell combination related information includes cell combination identification information and cell combination bandwidth information. The cell combination identification information is used to indicate a cell combination (that is, one PCell and one SCell), and may include a cell identity of the PCell, frequency information of the PCell, and frequency information of the SCell. The frequency information of the cell (for example, PCell and SCell) may be one frequency, or may be a number of one frequency. This is not limited herein. In addition, the cell combination information max further include a cell identity of the SCell. The cell combination bandwidth information is used to indicate bandwidth of the cell combination, and may include bandwidth of the PCell and bandwidth of the SCell, or may include total bandwidth of the PCell and the SCell, or may include bandwidth of the PCell, bandwidth of the SCell, and total bandwidth of the PCell and the SCell.

For example, if the cell combination identification information includes the cell identity of the PCell, the frequency information of the PCell, and the frequency information of the SCell, and the cell combination bandwidth information includes the total bandwidth of the PCell and the SCell, the cell combination related information may be stored in a form of Table 1.

TABLE 1

| Cell combination identification information | | | Cell |
|---|---|---|---|
| Cell identity of the PCell | Frequency information of the PCell | Frequency information of the SCell | combination bandwidth information |
| Cell identity 1 | $F_{L1}$ | $F_{N1}$ | $N_1$ |
| Cell identity 2 | $F_{L2}$ | $F_{N2}$ | $N_2$ |
| . . . | . . . | . . . | . . . |

For another example, when the cell combination identification information includes a cell identity of the PCell, the frequency information of the PCell, and the frequency information of the SCell, and the cell combination bandwidth information is used to indicate the bandwidth of the PCell, the bandwidth of the SCell, and the total bandwidth of the PCell and the SCell, the cell combination related information may be stored in a form of Table 2.

TABLE 2

| Cell combination identification information | | | | | |
|---|---|---|---|---|---|
| Cell identity of the PCell | Frequency information of the PCell | Frequency information of the SCell | Cell combination bandwidth information PCell | SCell | P + S |
| Cell identity 1 | $F_{L1}$ | $F_{N1}$ | $N_{P1}$ | $N_{S1}$ | $N_1$ |
| Cell identity 2 | $F_{L2}$ | $F_{N2}$ | $N_{P2}$ | $N_{S2}$ | $N_2$ |
| . . . | . . . | . . . | . . . | . . . | . . . |

Certainly, the foregoing description is merely an example of the storage form of the cell combination related information, and does not constitute a limitation on the storage form of the cell combination related information in this embodiment of this application. In this embodiment of this application, the cell combination related information may also be stored in another form.

Alternatively, the cell combination related information in this embodiment of this application is used to indicate a cell combination and bandwidth of the SCell. In this case, the cell combination related information may include cell combination identification information and bandwidth information of the SCell. For example, the cell combination related information may be stored in a form of Table 3.

TABLE 3

| Cell combination identification information | | | |
|---|---|---|---|
| Cell identity of the PCell | Frequency information of the PCell cell | Frequency information of the SCell cell | Bandwidth information of the SCell |
| Cell identity 1 | $F_{L1}$ | $F_{N1}$ | $N_{S1}$ |
| Cell identity 2 | $F_{L2}$ | $F_{N2}$ | $N_{S2}$ |
| . . . | . . . | . . . | . . . |

Specifically, the cell combination related information in this embodiment of this application may include a plurality of pieces of cell combination identification information and corresponding bandwidth information, and may be determined by the terminal and preset in the terminal based on network deployment information disclosed by an operator and/or network deployment information collected by a device vendor before delivery. Alternatively, the cell combination related information may be determined by the terminal based on network distribution information disclosed by an operator and/or network distribution information collected by a device vendor from a server after the terminal is powered on for the first time. Further, in some embodiments, the terminal may further update the cell combination related information stored in the terminal based on the historical network distribution information of the user in the use process and/or the cell combination related information pushed by a server, so as to improve reliability of the cell combination related information stored in the terminal. For example, the server may add the network deployment information or the cell combination related information to a software update data package and send the software update data package to the terminal. For example, an AP in the terminal receives a software update data package, and when detecting that the software update data package includes the network deployment information or the cell combination related information, sends the network deployment information or the cell combination related information to a CP in the terminal. The CP updates the stored cell combination related information based on the network deployment information or cell combination related information from the AP, It should be noted that the server may further push the network deployment information or the cell combination related information to the terminal in another manner. This is not limited.

The following describes a cell search method according to the embodiment of this application based on an EN-DC network architecture.

Figure 4:
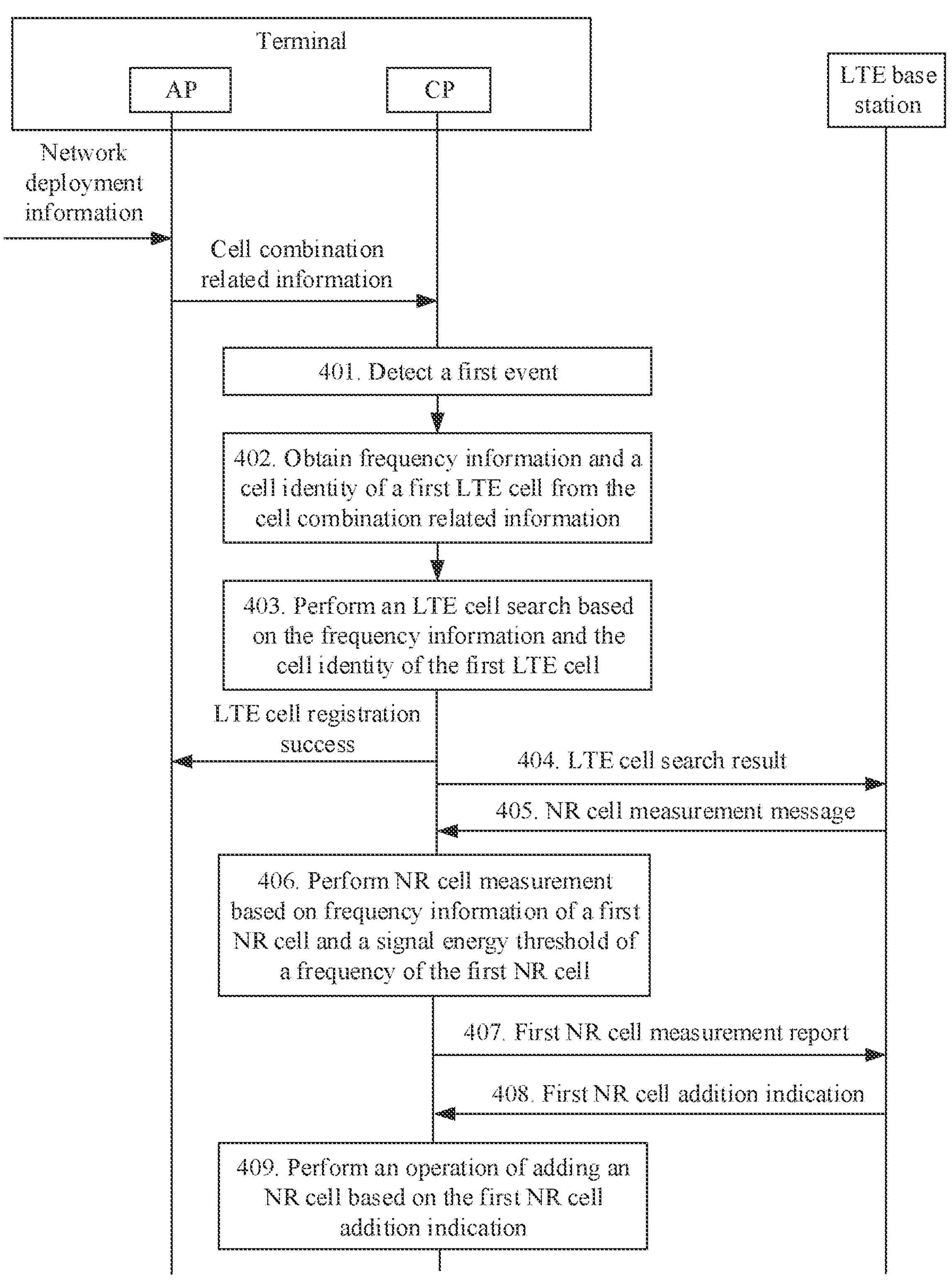
FIG. 4 is a schematic flowchart of a cell search method according to an embodiment of this application.

For example, FIG. 4 is a schematic flowchart of a cell search method according to an embodiment of this application. The method specifically includes the following steps.

401. A terminal detects a first event. The first event is used to trigger an LTE cell search. For details, refer to related descriptions of the first event in the method shown in FIG. 1. Details are not described herein again.

402. The terminal obtains frequency information and a cell identity of the first LTE cell from cell combination related information. The cell combination related information is used to indicate K cell combinations and bandwidth of the K cell combinations, where K is a positive integer. For details, refer to the foregoing related description. Details are not described herein again. The first LTE cell is an anchor cell (that is, a PCell) in the first cell combination, and the first cell combination is a cell combination with the highest bandwidth in the K cell combinations.

In some embodiments, the terminal obtains the cell combination related information based on geographic location information, so as to improve efficiency of performing the LTE cell search by the terminal. The geographical location information is used to indicate a current geographical location of the terminal. For example, the geographic location information may be obtained by the terminal based on global positioning system (GPS) information, or may be obtained based on a location based service (LBS). It may be understood that, in this embodiment of this application, the geographic location information may alternatively be obtained in another manner.

403. The terminal performs the LTE cell search based on the frequency information and the cell identity of the first LTE cell.

For example, the cell combination related information shown in Table 4 is used as an example.

TABLE 4

| Cell combination identification information | | | Cell combination bandwidth information |
|---|---|---|---|
| LTE cell identity | Frequency information of the LTE cell | Frequency information of the NR cell | |
| 1 | B1 | N1 | 120M |
| 2 | B2 | N2 | 100M |
| 3 | B3 | N3 | 125M |
| 3 | B3 | N4 | 120M |

It can be learned from Table 4 that when the LTE cell identity is 3, the frequency indicated by the frequency information of the LTE cell is 133, and the frequency indicated by the frequency information of the NR cell is N3, and the bandwidth of the cell combination is 125M, which is the highest bandwidth in the cell combination related information, the LTE cell whose identity is 1 and whose is B3 is the first LTE cell. When the first event is detected, the LTE base station may learn, based on the cell combination related information, that the cell identity of the first LTE cell is 3 and the frequency indicated by the frequency information is B3, and then perform an LTE cell search based on the cell identity 3 and the frequency B3.

For example, the terminal may store the cell combination identification information in descending order of bandwidth of cell combinations, so that the terminal quickly obtains the cell combination identification information corresponding to the highest bandwidth of a cell combination.

For example, the terminal may perform the LTE cell search based on the frequency information and the cell identity of the first LTE cell in the following manner:

The terminal performs signal energy detection based on the frequency information of the first LTE cell. If the terminal detects signal energy, the terminal receives system information of the first LTE cell based on the cell identity of the first LTE cell. The system information of the first LTE cell includes a first signal energy threshold. When the signal energy detected by the terminal based on the frequency information of the first LTE cell is greater than or equal to the first signal energy threshold, the terminal succeeds in the LTE cell search, that is, the terminal finds the first LTE cell.

In some embodiments, if the terminal detects no signal energy based on the frequency information of the first LTE cell, or the detected signal energy is less than the first signal energy threshold, the terminal fails in the LTE cell search, that is, the terminal does not find the first LTE cell based on the frequency information of the first LTE cell. For a case in which the terminal does not find the LTE cell based on the frequency information and the cell identity of the first LTE cell, refer to the following related description.

404. The terminal finds the first LTE cell, registers with the first LTE cell, and sends an LTE cell search result to the LTE base station. The LTE cell search result includes the cell identity and the frequency information of the first LTE cell of the first LTE cell.

For example, if the signal energy detected by the terminal based on the frequency information of the first LTE cell is greater than or equal to the first signal energy threshold, the terminal initiates a cell registration procedure to the LTE base station based on the cell identity of the first LTE cell and the frequency information of the first LTE cell, so that the terminal registers with the first LTE cell. For a specific cell registration procedure, refer to the existing related description. Details are not described herein again.

405. The LTE base station receives the LTE cell search result from the terminal, and sends an NR cell measurement message to the terminal, where the NR cell measurement message includes frequency information of L NR cells configured for the first LTE cell and signal energy thresholds of frequencies of the L NR cells. L is a positive integer greater than or equal to 2.

It should be noted that a value of L is not greater than a total quantity of the frequencies of the NR cells configured for the first LTE cell. For example, five NR cells are configured for the first LTE cell, and frequencies of the five NR cells are different. In this case, the value of L may be 5 or less than 5, which is related to specific implementation of the LTE base station. This is not limited herein.

406. The terminal receives the NR cell measurement message sent by the LTE base station, and performs the NR cell measurement based on the frequency information of the first NR cell in the frequency information of the L NR cells and the signal energy threshold of the frequency of the first NR cell. A cell combination formed by the first NR cell and the first LTE cell has the highest bandwidth in L cell combinations. The L cell combinations herein refer to cell combinations formed by each NR cell and the first LTE cell in the L NR cells, and bandwidth of the L cell combinations is determined based on cell combination bandwidth information in cell combination related information.

For example, the terminal may perform NR cell measurement based on the frequency information of the first NR cell and the signal energy threshold of the frequency of the first NR cell in the following manner:

The terminal performs signal energy detection at the frequency indicated by the frequency information of the first NR cell. If the terminal detects the signal energy, determining whether the signal energy detected by the terminal is greater than or equal to the signal energy threshold of the frequency of the first NR cell. If the signal energy detected by the terminal is greater than or equal to the signal energy threshold of the frequency of the first NR cell, step 407 is performed.

In some embodiments, if the signal energy detected by the terminal is less than the signal energy threshold of the frequency of the first NR cell or the terminal does not detect the signal energy, the NR cell is measured based on the frequency information of the second NR cell in the frequency information of the L NR cells and the signal energy threshold of the frequency of the second NR cell. A cell combination formed by the second NR cell and the first LTE cell has the highest bandwidth in L-1 cell combinations. The L-1 cell combinations herein refer to cell combinations in the L cell combinations except the cell combination formed by the first NR cell and the first LTE cell. If the signal energy detected by the terminal is less than the signal energy threshold of the frequency of the second NR cell, or the terminal does not detect the signal energy based on the frequency information of the second cell, the terminal performs the NR cell measurement based on the frequency information of the third NR cell in the frequency information of the L NR cells and the signal energy threshold of the frequency of the third NR cell. A combination formed by the third NR cell and the first LTE cell has the highest bandwidth in L-2 cell combinations. The L-2 cell combinations herein refer to cell combinations except a cell combination formed by a second NR cell and a first LTE cell in the L-1 cell combinations. By analogy, the NR cell measurement is stopped when the detected signal energy is greater than or equal to the signal energy threshold of the frequency of the corresponding NR cell.

For example, the cell combination related information shown in Table 4 is used as an example. When a value of L is 2, the frequency information that is of the L NR cells and that is configured for the first LIFE cells and that is included in the NR cell measurement message is respectively frequency information of the first NR cell and frequency information of the second NR cell. A frequency indicated by the frequency information of the first NR cell is N3, and a frequency indicated by the frequency information of the second NR cell is N4. If the identity of the first LTE cell is 3 and the frequency is B3, when the frequency indicated by the frequency information of the NR cell is N3, the bandwidth of the cell combination is 125M, and when the frequency indicated by the frequency information of the NR cell is N4, the bandwidth of the cell combination is 120M. Therefore, the terminal performs the NR cell measurement at the frequency N3 based on the signal energy threshold of the frequency N3. If the signal energy detected by the terminal at the frequency N3 is less than the signal energy threshold of the frequency N3, or the terminal does not detect the signal energy, the terminal performs the NR cell measurement at the frequency N2 based on the signal energy threshold of the frequency N2.

In some embodiments, if the cell combination related information stores only the frequency information of some NR cells in the frequency information of the L NR cells, the terminal may perform the NR cell measurement at the frequency indicated by the frequency information of the some NR cells in descending order of bandwidth of the cell combinations. If no signal energy is detected at the frequency indicated by the frequency information of this part of NR cells, or the detected signal energy is less than the signal energy threshold of the corresponding frequency, the terminal may randomly select the frequency information of one NR cell from the frequency information of the other part of the NR cells in the L NR cells to perform the NR cell measurement until the detected signal energy is greater than or equal to the signal energy threshold of the corresponding frequency. In this case, the terminal may also update the stored cell combination related information based on the LTE cell with which the terminal is registered and the identification information and bandwidth information that are of the added NR cells.

For example, that a value of L is 3 is used as an example, the frequency information of the L NR cells includes the frequency information of the first NR cell, the frequency information of the second NR cell, and the frequency information of the third NR cell. If the cell combination related information stores the frequency related information of the first NR cell and the frequency information of the second NR cell, the terminal may perform the NR cell measurement based on the frequency-related information of the first NR cell and the frequency information of the second NR cell in descending order of bandwidth of the cell combinations. If the signal energy detected based on the frequency-related information of the first NR cell and the frequency information of the second NR cell is less than the signal energy threshold of the corresponding frequency, or no signal energy is detected, the terminal performs the NR cell measurement based on the frequency information of the third NR cell. In this case, if the signal energy detected by the terminal based on the frequency information of the third NR cell is greater than or equal to the signal energy threshold of the corresponding frequency, the frequency information of the third NR cell, the frequency information of the first LTE cell, and the bandwidth of the corresponding cell combination are stored in the cell combination related information.

In some other embodiments of this application, if the terminal performs the NR cell measurement based on the frequency information of the L NR cells, and the detected signal energy is all less than a signal energy threshold of a frequency of a corresponding NR cell, the terminal may re-perform LTE cell search. For example, the terminal may re-perform an LTE cell search by sweeping the LTE frequency band supported by the terminal; or the frequency information of an LTE cell and the cell identity of the LTE cell may be re-obtained from the cell combination information based on the bandwidth of the cell combination, and the LTE cell search may be re-performed.

407. The terminal sends a first NR cell measurement report to the LYE base station. The first NR cell measurement report includes the frequency information of the first NR cell.

408. After receiving the first NR cell measurement report from the terminal, the LTE base station sends an NR cell addition indication to the terminal, where the NR cell addition indication is used to indicate an NR cell added by the terminal. The frequency of the NR cell that is indicated by the NR cell addition indication is a frequency indicated by the frequency information of the first NR cell.

409. After receiving the first NR cell addition indication from the LTE base station, the terminal performs an NR cell adding operation based on the NR cell indicated by the first NR cell addition indication.

Further, in some embodiments, the terminal starts a timer in response to sending the first NR cell measurement report to the LTE base station. If the first NR cell addition indication sent by the LTE base station is still not received when the timer expires, the terminal may perform the NR cell measurement based on the frequency information of the second NR cell in the frequency information of the L NR cells and the signal energy threshold of the frequency of the second NR cell, send a second NR cell measurement report to the LTE base station, and restart the timer in response to sending the second NR cell measurement report to the LIFE base station. If the second NR cell addition indication sent by the LTE base station is still not received when the timer expires, the terminal may perform the NR cell measurement based on the frequency information of the third NR cell in the frequency information of the L NR cells and the signal energy threshold of the frequency of the third NR cell, and send a second NR cell measurement report to the LTE base station, and so on, until the terminal receives the NR cell addition indication sent by the LTE base station. For the second NR cell and the third NR cell, refer to the foregoing related description. Details are not described herein again.

It should be noted that, in this embodiment of this application, timing duration of the timer may be predefined, may be indicated by the LTE base station to the terminal, or may be determined by the terminal based on an algorithm or policy. This is not limited. For example, a predefined initial value of the timing duration of the timer in the terminal is 3 seconds, and the terminal may correspondingly adjust the timing duration of the timer based on information such as an actual network signal strength and a distance between the LTE base station and the terminal. For example, the terminal starts the timer T1 in response to sending the first NR cell measurement report to the LTE base station.

Alternatively, steps 407-409 in this embodiment of this application may be replaced with the following step:

If the signal energy detected based on the frequency information of the first NR cell is greater than the signal energy threshold of the frequency of the first NR cell, the terminal performs an operation of adding the first NR cell. Further, the terminal may further report the NR cell addition indication to the LTE base station, where the NR cell addition indication is used to indicate the first NR cell. For example, the NR cell addition indication may include the cell identity and the frequency information of the first NR cell. This helps implement quick addition of an NR cell.

In addition, in some other embodiments of this application, if the terminal does not find the first LTE cell based on the frequency information and the cell identity of the first LTE cell, the terminal obtains the frequency information and the cell identity of the second LTE cell from the cell combination related information, the second LTE cell is an anchor cell in the second cell combination, the second cell combination is a cell combination with the highest bandwidth in the K-1 cell combinations, and the K-1 cell combinations are cell combinations except the first cell combination in the K cell combinations. Then, the terminal performs the LTE cell search based on the cell identity and the frequency information of the second LTE cell. If the terminal still finds no LTE cell based on the frequency information and the cell identity of the second LTE cell, the terminal obtains the frequency information and the cell identity of the third. LTE cell from the cell combination phase relationship information, the third LTE cell is an anchor cell in the third cell combination, the third cell combination is a cell combination with the highest bandwidth in the K-2 cell combinations, and the K-2 cell combinations are a cell combination except the first cell combination and the second cell combination in the K cell combinations. The terminal continues to perform the LTE cell search based on the cell identity and the frequency information of the third LTE cell, and so on, until the terminal finds an LTE cell.

Further, in some embodiments, if the terminal still does not find an LTE cell after traversing the frequency information and the cell identity of all the LTE cells in the cell combination related information, the terminal may sweep the LTE frequency band supported by the terminal. For details, refer to related descriptions in FIG. 1. Details are not described herein again.

For example, the cell combination related information shown in Table 4 is used as an example. If the terminal does not find the LTE cell based on the LTE cell identity 3 and the frequency B3, the terminal performs the LTE cell search based on the LTE cell identity 1 and the frequency B1. If terminal still does not find the LTE cell based on the LTE cell identity 1 and the frequency B1, the terminal continues to perform the LTE cell search based on the LTE cell identity 2 and the frequency B2. If the terminal still does not find an LTE cell based on the LTE cell identity 2 and the frequency band B2, the terminal may perform the LTE search by sweeping the frequency band supported by the terminal. In this case, the terminal updates the stored cell combination related information based on the found new LTE cell and the identification information and bandwidth information of the NR cell that are added to the new LTE cell.

In this embodiment of this application, when performing the LTE cell search and NR cell addition based on cell combination related information, the terminal considers not only whether the LTE cell is an anchor cell, but also the bandwidth of the LTE cell and the NR Therefore, this helps provide a possibility that the LTE cell on which the terminal camps is an anchor cell, and also helps improve total bandwidth of the LTE cell on which the terminal camps and the added NR cell, thereby improving user experience.

It should be noted that the cell search method shown in FIG. 4 may be performed by using a CP in the terminal. For example, the cell search method shown in FIG. 4 may be performed by using a modem processor in the terminal. When the terminal is registered with the first LTE cell, the CP may further indicate to the AP that the terminal has successfully registered with the LTE cell.

Alternatively, in this embodiment of this application, the LTE cell may be found based on the method shown in FIG. 1, and the NR cell may be measured based on the bandwidth of the cell combination or the bandwidth of the NR cell.

Figure 5:
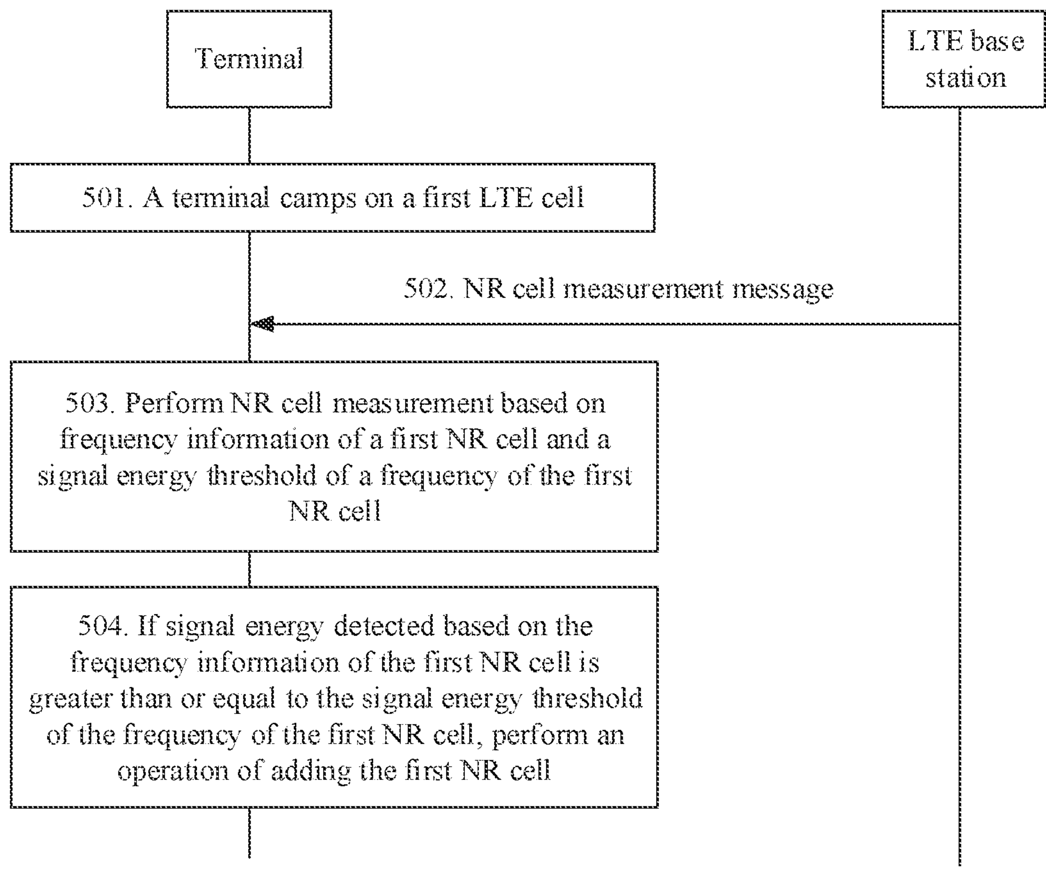
FIG. 5 is a schematic flowchart of a secondary cell adding method according to an embodiment of this application.

For example, FIG. 5 is a schematic flowchart of a SCell adding method according to an embodiment of this application. The method specifically includes the following steps.

501. A terminal camps on a first LTE cell, where the first LTE cell is an anchor cell. It should be understood that the first LTE cell is an anchor cell, that is, it may be understood that the first LTE cell supports NSA.

It should be noted that the terminal camps on the first LTE cell, that is, the terminal registers with the first LTE cell. For a manner in which the terminal registers with the first LTE cell, refer to the cell search method shown in FIG. 1, or refer to the cell search method shown in FIG. 4. Details are not described herein again.

502. The terminal receives an NR cell measurement message sent by the LTE base station. The NR cell measurement message includes the frequency information of the L NR cells and the signal energy threshold of the frequencies of the L NR cells. For a value of L, refer to related descriptions in the cell search method in FIG. 4. Details are not described herein again.

503. The terminal performs NR cell measurement based on the frequency information of the first NR cell in the frequency information of the L NR cells and the signal energy threshold of the frequency of the first NR cell. The frequency of the first NR cell has the highest priority in the L NR cells. For example, the cell combination formed by the first NR cell and the first LTE cell has the highest bandwidth in the L cell combinations. The L cell combinations herein refer to cell combinations formed by each NR cell and the first LTE cell in the L NR cells, and bandwidth of the L cell combinations is determined based on cell combination bandwidth information in cell combination related information. Alternatively, the first NR cell is an NR cell with the highest bandwidth in the L NR cells.

For example, the cell combination related information shown in Table 5 is used as an example,

TABLE 5

| Cell combination identification information | | | |
|---|---|---|---|
| LTE cell identity | Frequency information of the LTE cell | Frequency information of the NR cell | Bandwidth information of the NR cell |
| 1 | B1 | N1 | 100M |
| 2 | B2 | N2 | 80M |
| 3 | B3 | N3 | 120M |
| 3 | B3 | N4 | 110M |

That the cell identity of the first LTE cell is the cell identity 3 in Table 5, and the frequency indicated by the frequency information of the first LTE cell is B3 is used as an example. If the value of L is 2, frequencies indicated by the frequency information of the L NR cells are N3 and N4. If the identity of the LTE cell is 1 and the frequency is B3, when the frequency of the NR cell is N3, the bandwidth of the NR cell is 120M, and when the frequency of the NR cell is N4, the bandwidth of the NR cell is 110M. Therefore, the terminal performs NR cell measurement at the frequency N3.

For example, for each LTE cell, the terminal may store cell combination identification information in descending order of the bandwidth of the NR cells, so that the terminal quickly obtains the cell combination identification information corresponding to the highest bandwidth of the NR cell.

Certainly, the priority of the frequency of the NR cell may be represented by another network deployment parameter, in addition to the NR cell bandwidth or the cell combination bandwidth. This is not limited.

504. If the signal energy detected based on the frequency information of the first NR cell is greater than or equal to the signal energy threshold of the frequency of the first NR cell, the terminal performs an operation of adding the first NR cell.

For the operation of adding the first NR cell by the terminal, refer to related descriptions in FIG. 4. Details are not described herein again.

It should be noted that when the signal energy detected based on the frequency information of the first NR cell is less than the signal energy threshold of the frequency of the first NR cell, or no signal energy is detected based on the frequency information of the first NR cell, the NR cell measurement is performed based on the frequency information of the second NR cell in the frequency information of the L NR cells and the signal energy threshold of the frequency of the second NR cell. A cell combination formed by the second NR cell and the first LTE cell has the highest bandwidth in L-1 cell combinations. The L-1 cell combinations herein refer to cell combinations in the L cell combinations except the cell combination formed by the first NR cell and the first LTE cell. If the signal energy detected by the terminal is less than the signal energy threshold of the frequency of the second NR cell, or the terminal does not detect the signal energy based on the frequency information of the second cell, the terminal performs the NR cell measurement based on the frequency information of the third NR cell in the frequency information of the L NR cells and the signal energy threshold of the frequency of the third NR cell. A combination formed by the third NR cell and the first LIFE cell has the highest bandwidth in L-2 cell combinations. The L-2 cell combinations herein refer to cell combinations except a cell combination formed by a second NR cell and a first LTE cell in the L-1 cell combinations. By analogy, the NR cell measurement is stopped when the detected signal energy is greater than or equal to the signal energy threshold of the frequency of the corresponding NR cell.

It should be understood that the foregoing description is provided by using NSA of the EN-DC network architecture as an example. The cell search method in this embodiment of this application may further be applied to NSA of another DC network architecture, such as an NE-DC network architecture, an NGEN-DC network architecture, or an NR-NR network architecture. Certainly, with evolution of a communication network, the cell network search method in this embodiment of this application may be further applied to a DC network architecture formed by NR and a future communication system, which is not limited.

The foregoing embodiments may be used separately, and may be used together to achieve different technical effects.

The foregoing embodiments may be used separately, and may be used together to achieve different technical effects.

In the foregoing embodiments provided in this application, the communication methods provided in the embodiments of this application are described from a perspective of a terminal as an execution body. To implement functions in the communication methods provided in the foregoing embodiments of this application, the terminal may include a hardware structure and/or a software module, and implement the foregoing functions in a form of a hardware structure, a software module, or a hardware structure plus a software module. A function in the foregoing functions is performed in a form of a hardware structure, a software module, or a hardware structure plus a software module, which depends on a specific application and a design constraint of the technical solution.

Figure 6:
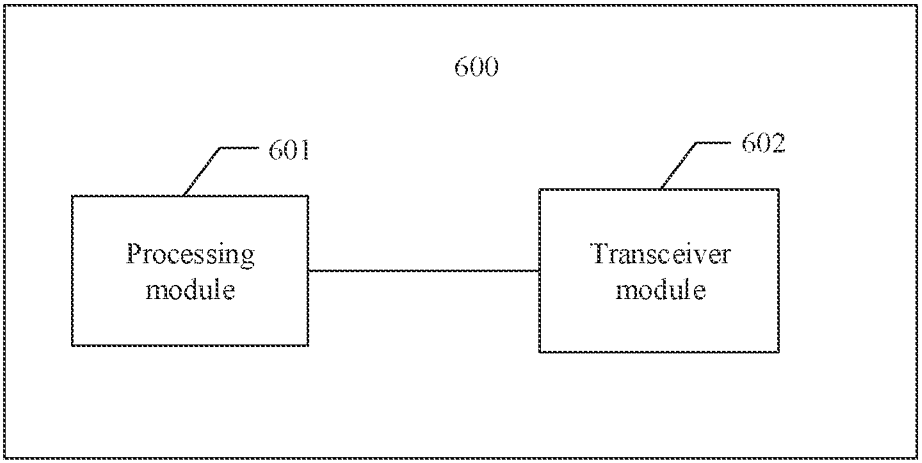
FIG. 6 is a schematic diagram of a structure of an apparatus according to an embodiment of this application.

Same as the foregoing concept, as shown in FIG. 6, an embodiment of this application further provides an apparatus 600. The apparatus 600 includes a processing module 601 and a transceiver module 602.

The processing module 601 is configured to camp on a first primary cell, where the first primary cell supports NSA. The transceiver module 602 is configured to receive a secondary cell measurement message sent by a network device, where the secondary cell measurement message includes a frequency of a first secondary cell and a first signal energy threshold, and a frequency of a second secondary cell and a second signal energy threshold. The processing module 601 is further configured to: perform secondary cell measurement based on the frequency of the first secondary cell, where a priority of the frequency of the first secondary cell is higher than a priority of the frequency of the second secondary cell; and when the signal energy detected at the frequency of the first secondary cell is greater than or equal to the first signal energy threshold, performing an operation of adding the first secondary cell.

For specific execution processes of the processing module 601 and the transceiver module 602, refer to the descriptions in the foregoing method embodiments. The module division in this embodiment of this application is an example, and is merely logical function division. In actual implementation, there may be another division manner. In addition, the function modules in the embodiments of this application may be integrated into one processor or may be physically separated, or two or more modules may be integrated into one module. The foregoing integrated module may be implemented in a form of hardware, or may be implemented in a form of a software function module.

Figure 7:
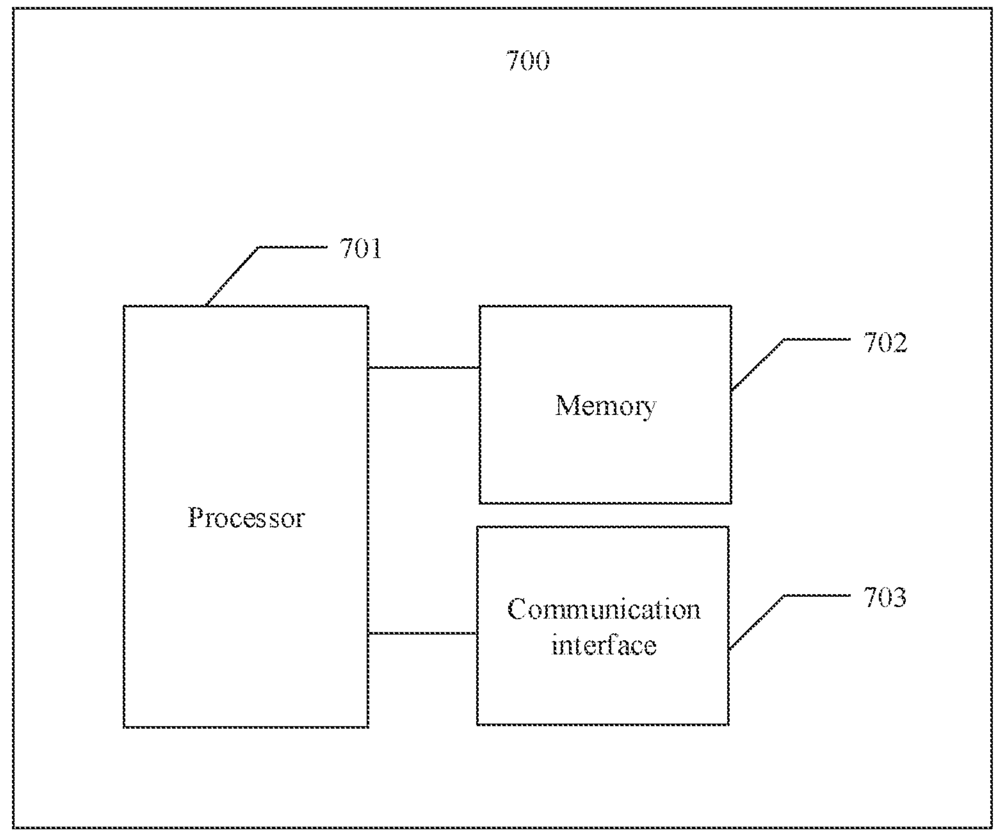
FIG. 7 is a schematic diagram of a structure of another apparatus according to an embodiment of this application.

Same as the foregoing concept, as shown in FIG. 7, an embodiment of this application further provides an apparatus 700.

For example, the apparatus 700 is configured to implement a function of the terminal in the foregoing method. The apparatus may be a terminal, or may be a chip or a chip system in the terminal. The apparatus 700 includes at least one processor 701, configured to implement a function of the terminal in the foregoing method. For example, the processor 701 may be configured to: perform secondary cell measurement based on a frequency of a first secondary cell, and when signal energy detected at the frequency of the first secondary cell is greater than or equal to a first signal energy threshold, perform the operation of adding the first secondary cell. For details, refer to detailed descriptions in the method. Details are not described herein again.

In some embodiments, the apparatus 700 may further include at least one memory 702, configured to store a program computer program. The memory 702 is coupled to the processor 701. The coupling in this embodiment of this application is an indirect coupling or communication connection between the apparatuses, units, or modules, and may be in an electrical, mechanical, or another form, and is used for information exchange between the apparatuses, units, or modules. In another implementation, the memory 702 may alternatively be located outside the apparatus 700. The processor 701 may operate in cooperation with the memory 702. The processor 701 may execute a computer program stored in the memory 702. At least one of the at least one memory may be included in a processor.

In some embodiments, the apparatus 700 may further include a communication interface 703, configured to communicate with another device by using a transmission medium, so that the apparatus in the apparatus 700 may communicate with another device. For example, the communication interface 703 may be a transceiver, a circuit, a bus, a module, or another type of communication interface, and the another device may be another terminal or a network device. The processor 701 receives and sends a message by using the communication interface 703, and is configured to implement the method in the foregoing embodiment. For example, the communication interface 703 may be configured to receive a secondary cell measurement message from a network device.

A connection medium between the foregoing communication interface 703, the processor 701, and the memory 702 is not limited in this embodiment of this application. For example, in FIG. 7 in this embodiment of this application, the memory 702, the processor 701, and the communication interface 703 may be connected by using a bus, and the bus may be classified into an address bus, a data bus, a control bus, and the like.

In this embodiment of this application, the processor may be a general-purpose processor, a digital signal processor, an application specific integrated circuit, a field programmable gate array or another programmable logic device, a discrete gate or transistor logic device, or a discrete hardware component, and may implement or perform the methods, steps, and logic block diagrams disclosed in the embodiments of this application. The general-purpose processor may be a microprocessor, any conventional processor, or the like. The steps of the methods disclosed with reference to the embodiments of this application may be directly performed by a hardware processor, or performed by a combination of hardware and software modules in the processor.

In this embodiment of this application, the memory may be a non-volatile memory, such as a hard disk drive (HDD) or a solid-state drive (SSD), or may be a volatile memory, such as a random-access memory (RAM). A memory is any other medium that can be used to carry or store expected program code in the form of an instruction or a data structure and that can be accessed by a computer, but is not limited thereto. The memory in this embodiment of this application may be a circuit or any other apparatus that can implement a storage function, and is configured to store a program instruction and/or data.

In the methods provided in the embodiments of this application, software, hardware, firmware, or any combination thereof may be implemented in whole or in part. When software is used for implementation, the methods may be implemented in whole or in part in the form of a computer program product. The computer program product includes one or more computer instructions. When the computer program instruction is loaded and executed on a computer, a process or a function described in the embodiments of the present disclosure is completely or partially generated. The computer may be a general-purpose computer, a special-purpose computer, a computer network, a network device, user equipment, or another programmable apparatus. The computer instruction may be stored in a computer readable storage medium or transmitted from one computer readable storage medium to another computer readable storage medium, for example, the computer instruction may be transmitted from one network site, computer, server or data center to another network site, computer, server or data center in a wired (such as coaxial cable, optical fiber, or digital subscriber line (DSL)) or wireless (such as infrared, wireless, or microwave) manner. The computer readable storage medium may be any available medium accessible by a computer or a data storage device such as a server or a data center that integrates one or more available media. The available medium may be a magnetic medium (for example, floppy disk, hard disk, or magnetic tape), an optical medium (for example, digital video disc (DVD)), a semiconductor medium (for example, SSD), or the like.

Apparently, a person skilled in the art may make various changes and variations to this application without departing from the scope of this application. In this way, if these modifications and variations of this application fall within the scope of the claims of this application and the equivalent technologies thereof, this application is also intended to include these modifications and variations.

What is claimed is:

1. A method for adding a secondary cell, wherein the method comprises:

camping, by a terminal, on a first primary cell, wherein the first primary cell supports non-standalone NSA networking;

receiving, by the terminal, a secondary cell measurement message sent by a network device, wherein the secondary cell measurement message comprises a first frequency of a first secondary cell and a first signal energy threshold, and a second frequency of a second secondary cell and a second signal energy threshold, wherein the first frequency is different from the second frequency, wherein the first frequency is a frequency of a secondary cell that has been historically added by the terminal, and the first frequency and a bandwidth of the first secondary cell are stored in the terminal, and wherein the first signal energy threshold is different from the second signal energy threshold;

performing, by the terminal, secondary cell measurement at the first frequency based on pre-stored cell combination related information indicating K cell combinations and bandwidth of the K cell combinations, wherein a priority of the first frequency is higher than a priority of the second frequency and a bandwidth of the first secondary cell is greater than a bandwidth of the second secondary cell, and wherein the first secondary cell and the first primary cell form a cell combination with highest bandwidth among the K cell combinations;

determining, by the terminal, whether signal energy detected at the first frequency is greater than or equal to the first signal energy threshold;

in response to determining that the signal energy detected at the first frequency is greater than or equal to the first signal energy threshold, performing, by the terminal, an operation of adding the first secondary cell;

in response to determining that the signal energy detected at the first frequency is less than the first signal energy threshold:

performing, by the terminal, the secondary cell measurement at the second frequency; and performing, by the terminal, an operation of adding the second secondary cell if signal energy detected at the second frequency is greater than or equal to the second signal energy threshold.

2. The method according to claim 1, wherein the performing, by the terminal, an operation of adding the first secondary cell comprises:

sending, by the terminal, a secondary cell measurement report to the network device if the signal energy detected at the first frequency is greater than or equal to the first signal energy threshold, wherein the secondary cell measurement report is used to indicate the first secondary cell;

receiving, by the terminal, a secondary cell addition indication sent by the network device, wherein the secondary cell addition indication is used to indicate the first secondary cell; and after receiving the secondary cell addition indication sent by the network device, performing, by the terminal, the operation of adding the first secondary cell based on the secondary cell addition indication.

3. The method according to claim 2, wherein the method further comprises:

starting, by the terminal, a timer in response to sending the secondary cell measurement report to the network device, wherein timing duration of the timer is first duration; and if the terminal does not receive the secondary cell addition indication from the network device after the timer expires, performing the secondary cell measurement based on the second frequency.

4. The method according to claim 1, wherein the method further comprises:

searching, by the terminal, for a primary cell in descending order of priorities of primary cells.

5. The method according to claim 4, wherein the searching, by the terminal, for a primary cell in descending order of priorities of primary cells comprises:

searching, by the terminal, for a primary cell in descending order of bandwidth of cell combinations, wherein each cell combination comprises a primary cell and a secondary cell.

6. The method according to claim 1, wherein the first primary cell is a first Long Term Evolution (LTE) cell, the first secondary cell is a first new radio (NR) cell, and the second secondary cell is a second NR cell.

7. A method for adding a secondary cell, wherein the method comprises:

detecting, by a terminal, a first event, wherein the first event is used to trigger a Long Term Evolution LTE cell search;

obtaining, by the terminal, frequency information and a cell identity of a first LTE cell based on cell combination related information, wherein the cell combination related information is used to indicate K cell combinations and bandwidth of the K cell combinations and is pre-stored in the terminal, each cell combination in the K cell combinations comprises one LTE cell and one new radio NR cell, the first LTE cell is an LTE cell in a first cell combination and supports non-standalone networking, and the first cell combination is a cell combination with the highest bandwidth in the K cell combinations;

performing, by the terminal, an LTE cell search based on the frequency information and the cell identity of the first LTE cell;

camping, by the terminal, on the first LTE cell, and sending an LTE search result to an LTE base station, wherein the LTE search result comprises frequency information of the first LTE cell and a cell identity of the first LTE cell;

receiving, by the terminal, an NR cell measurement message from the LTE base station, wherein the NR cell measurement message comprises a frequency of a first NR cell and a first signal energy threshold, and a frequency of a second NR cell and a second signal energy threshold; and when determining, based on the cell combination bandwidth information, that bandwidth of a cell combination formed by the first LTE cell and the first NR cell is greater than bandwidth of a cell combination formed by the first LTE cell and the second NR cell, performing, by the terminal, NR cell measurement based on the frequency of the first NR cell;

sending, by the terminal, an NR cell measurement report to the LTE base station if the signal energy detected at the frequency of the first NR cell is greater than or equal to the first signal energy threshold, wherein the NR cell measurement report is used to indicate the first NR cell; starting a timer in response to sending the NR cell measurement report to the LTE base station, wherein timing duration of the timer is first duration; and if the terminal receives an NR cell addition indication from the LTE base station before the timer expires, performing an operation of adding an NR cell based on the NR cell addition indication, wherein the NR cell addition indication is used to indicate the first NR cell; or if the terminal does not receive the NR cell addition indication from the LTE base station until the timer expires, performing the NR cell measurement based on the frequency of the second NR cell.

8. A terminal, comprising: a processing module and a transceiver module, wherein the processing module is configured to camp on a first primary cell, wherein the first primary cell supports non-standalone networking;

the transceiver module is configured to receive a secondary cell measurement message sent by a network device, wherein the secondary cell measurement message comprises a first frequency of a first secondary cell and a first signal energy threshold, and a second frequency of a second secondary cell and a second signal energy threshold, wherein the first frequency is different from the second frequency, wherein the first frequency is a frequency of a secondary cell that has been historically added by the terminal, and the first frequency and a bandwidth of the first secondary cell are stored in the terminal, and wherein the first signal energy threshold is different from the second signal energy threshold;

the processing module is further configured to:

perform secondary cell measurement at the first frequency based on pre-stored cell combination related information indicating K cell combinations and bandwidth of the K cell combinations, wherein a priority of the first frequency is higher than a priority of the second frequency and a bandwidth of the first secondary cell is greater than a bandwidth of the second secondary cell, and wherein the first secondary cell and the first primary cell form a cell combination with highest bandwidth among the K cell combinations;

determine whether signal energy detected at the first frequency is greater than or equal to the first signal energy threshold;

in response to determining that the signal energy detected at the first frequency is greater than or equal to the first signal energy threshold, perform an operation of adding the first secondary cell;

in response to determining that the signal energy detected at the first frequency is less than the first signal energy threshold:

perform the secondary cell measurement at the second frequency; and perform an operation of adding the second secondary cell if signal energy detected at the second frequency is greater than or equal to the second signal energy threshold.

9. The terminal according to claim 8, wherein that the processing module is configured to perform an operation of adding the first secondary cell comprises:

the processing module is configured to: trigger the transceiver module to send a secondary cell measurement report to the network device if the signal energy detected at the first frequency is greater than or equal to the first signal energy threshold, wherein the secondary cell measurement report is used to indicate the first secondary cell, and after the transceiver module receives a secondary cell addition indication sent by the network device, perform the operation of adding the first secondary cell based on the secondary cell addition indication, wherein the secondary cell addition indication is used to indicate the first secondary cell.

10. The terminal according to claim 9, wherein the processing module is further configured to:

start a timer in response to sending the secondary cell measurement report to the network device, wherein timing duration of the timer is first duration; and if the transceiver module does not receive the secondary cell addition indication from the network device after the timer expires, perform the secondary cell measurement based on the second frequency.

11. The terminal according to claim 8, wherein the processing module is further configured to:

search for a primary cell in descending order of priorities of primary cells.

12. The terminal according to claim 11, wherein searching for a primary cell in descending order of priorities of primary cells comprises:

searching for a primary cell in descending order of bandwidth of cell combinations, wherein each cell combination comprises a primary cell and a secondary cell.

13. The terminal according to claim 8, wherein the first primary cell is a first Long Term Evolution (LTE) cell, the first secondary cell is a first new radio (NR) cell, and the second secondary cell is a second NR cell.

* * * * *